Sept. 27, 1949.　　　　T. J. HINCHON　　　　2,483,050
CONDUIT FOR ELECTRIC POWER LINES
Filed June 18, 1946　　　　　　　　　　2 Sheets-Sheet 1
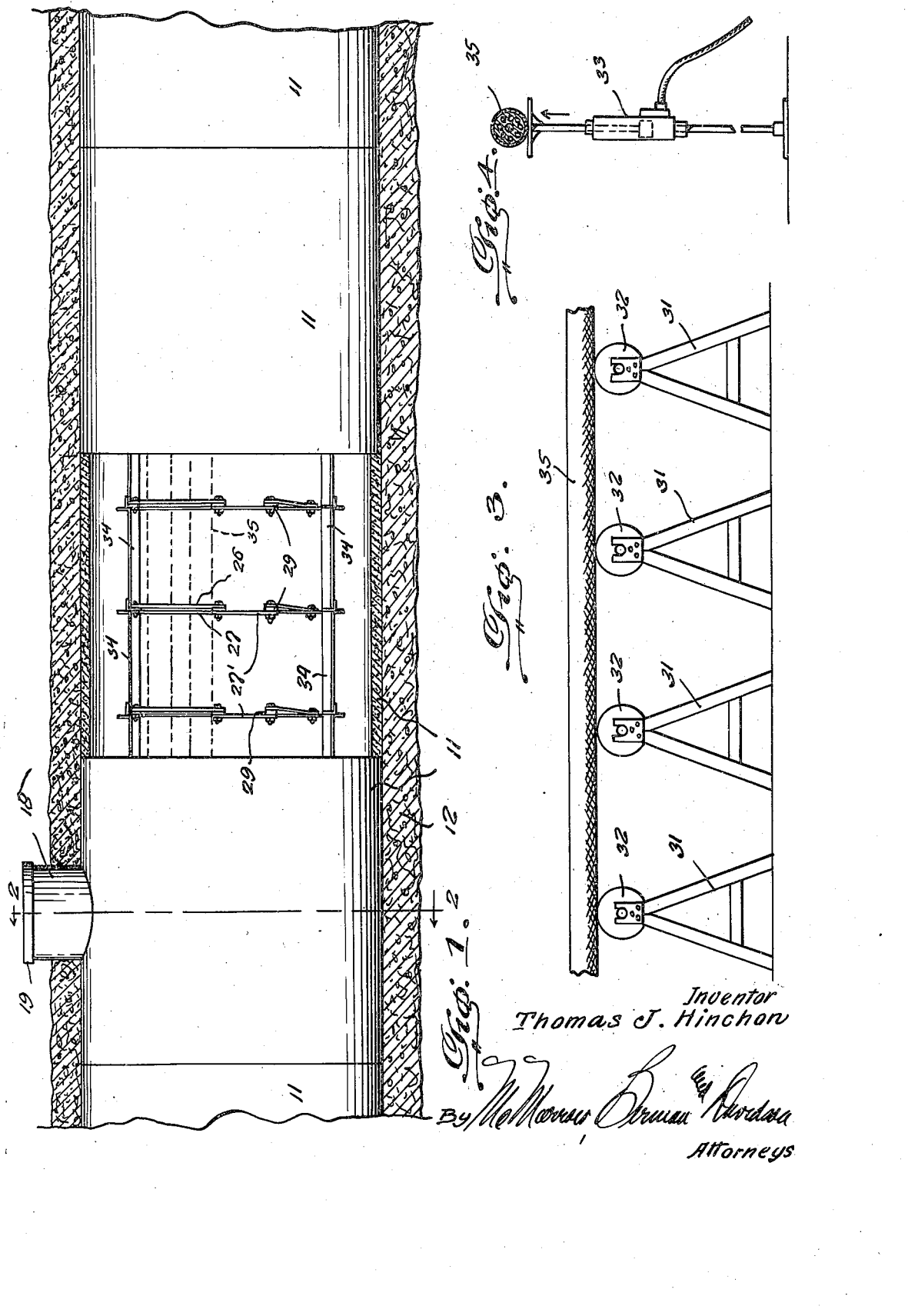
Inventor
Thomas J. Hinchon Sept. 27, 1949.　　　　　T. J. HINCHON　　　　　2,483,050
CONDUIT FOR ELECTRIC POWER LINES
Filed June 18, 1946　　　　　　　　　　　　　　2 Sheets-Sheet 2
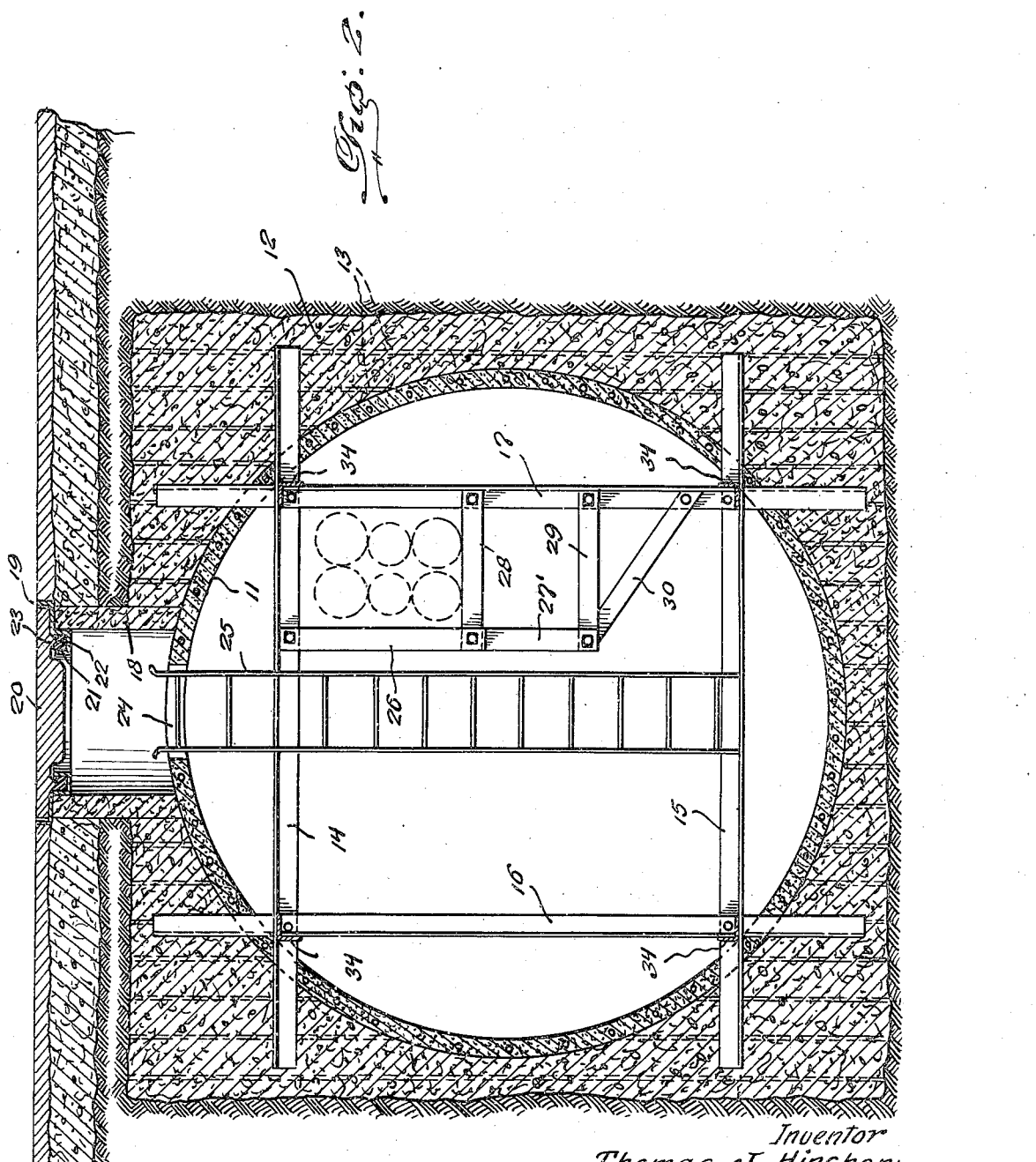
Inventor
Thomas J. Hinchon,
Attorneys Patented Sept. 27, 1949

2,483,050

UNITED STATES PATENT OFFICE 2,483,050

CONDUIT FOR ELECTRIC POWER LINES

Thomas J. Hinchon, Quincy, Mass.

Application June 18, 1946, Serial No. 677,453

1 Claim. (Cl. 138—48)

This invention relates to protective structures for underground electric power lines, and more particularly to underground conduits for a plurality of power lines and their associated electrical equipment.

A main object of the invention is to provide a novel and improved conduit structure for heavy electric power lines, said structure being relatively simple to build, very sturdy in construction and readily accessible for installation and repair of the electrical equipment installed therein.

A further object of the invention is to provide an improved underground conduit structure for heavy electrical power conductors, said structure being very efficiently reinforced to provide maximum resistance to earth disturbances and concussions and being watertight to prevent flooding and short-circuiting of the power lines.

Further objects and advantages of the invention will become apparent from the following description and claim, and from the accompanying drawings, wherein:

Figure 1 is a side elevational view, partly in cross-section, of a portion of an underground conduit structure according to the present invention.

Figure 2 is a transverse cross-sectional view taken on line 2—2 of the conduit structure of Figure 1.

Figure 3 is a side elevational view illustrating a method of supporting power conductors during installation in the conduit of the present invention.

Figure 4 is a view illustrating a method of raising the power conductors to their desired locations in the conduit structure during installation of said conductors.

Referring to the drawings, the conduit structure comprises an inner shell consisting of lengths of reinforced concrete pipe 11 placed end to end to form a continuous conduit, said shell members being located several feet below ground level. Poured around the shell is a monolithic concrete block 12 which extends for the length of the conduit and is reinforced with steel reinforcing bars 13. The block 12 is approximately square in cross-section and is of substantial thickness, whereby a very rigid support is provided for the inner shell. Passing through each section 11 and embedded in the block 12 are a plurality of upper and lower horizontal angle bars 14 and 15 which are secured to similar vertical pairs of side angle bars 16 and 17 also passing through the walls of the sections 11 and rigidly embedded in the block 12. The connected angle bars 14, 15, 16 and 17 define a substantially rectangular framework extending in a transverse vertical plane and there are several such transverse frameworks for each shell section 11, the frameworks being longitudinally spaced at equal intervals. Connecting the successive corner intersections of the vertical and horizontal angle bars forming the respective rectangular frameworks are longitudinal angle bars 34. The longitudinal angle bars 34 serve to reinforce and rigidify the conduit in a longitudinal direction.

At predetermined intervals the conduit is provided with manhole structures each comprising a concrete vertical shell member 18 which rests on the top of a shell member 11 in the plane of one of the transverse frameworks and extends upwardly almost to ground level. Positioned on the rim of member 18 is an annular metal seat 19 for a manhole cover 20, said seat being formed with an inner annular channel 21 which receives an annular rubber gasket 22. The manhole cover 20 is formed with a depending annular rib 23 which bears on gasket 22, thereby providing a watertight seal for the manhole cover. Below the manhole cover 20 the top of the shell section 11 is formed with an opening 24 through which projects the upper portion of a vertical ladder 25 which is secured to a subadjacent horizontal angle bar 14 and to the bottom angle bar 15 of the associated transverse framework.

Secured to the upper horizontal angle bar 14 and the side bar 17 of each transverse framework is a rack structure comprising a pair of depending vertical arms 26 and 27, between which is secured one end of a horizontal bar member 28, the other end of said bar member being secured to side bar 17. The electrical power line conductors 35 are supported on the horizontal bar members 28, as shown in Figures 1 and 2, along the length of the conduit. A space for supporting additional conductors is provided by providing an additional arm 27' connected to and extending downwardly from the connection of bar member 27 with bar member 28 and connecting it to one end of a second horizontal bar member 29, the other end of bar member 29 being connected to side bar 17 below the connection of bar member 28 thereto. A diagonal brace member 30 is connected between the lower portion of side bar 17 and the junction of members 27' and 29 to rigidify the conductor supporting rack structure.

In installing the conductors in the conduit, the conductor reels are positioned so that the conductors may be unwound and pulled through a first manhole by a suitable cable connected to a winch located adjacent the next succeeding manhole. To facilitate the movement of the conductors between manholes, a plurality of longitudinally spaced supporting trestles 31 are provided, each trestle having a transverse roller member 32 rotatively mounted on its top portion upon which the conductor is conveyed to its longitudinal position in the conduit. The conductors may be successively raised off the trestles to their desired elevations by pneumatic jacks, such as shown at 33 in Figure 4. After all the conductors have been moved into their desired positions adjacent the upper portion of side bar 17, the rack structures consisting of the bar members 26, 27, 28, 27', 29 and 30 are secured in their final positions, as shown in Figures 1 and 2 and the pneumatic jacks 33 may be removed.

At the central station the reels are of course unwound directly into the conduit and the conductors are each hauled into position by a cable passing through the first manhole and connected to a suitable winch.

The diameter of the inner shell sections 11 is substantial so as to provide ample space inside the conduit for inspection and repair of the conductors and other electrical equipment located therein. A preferred minimum diameter of said inner shell sections would be eight feet.

While a specific embodiment of a conduit structure for power line conductors has been disclosed in the foregoing description, it will be understood that various modifications within the spirit of the invention may occur to those skilled in the art. Therefore, it is intended that no limitations be placed on the invention other than as defined by the scope of the appended claim.

What is claimed is:

In a protective structure for underground electric power lines, the combination with a plurality of pipes arranged in end-to-end relation to define a continuous shell, and a block of monolithic concrete surrounding said shell, of a plurality of rectangular frames spaced from each other and arranged longitudinally along said shell, each of said frames comprising a pair of spaced parallel bars disposed horizontally and a pair of spaced parallel bars disposed vertically secured to said horizontally-disposed bars, the ends of said bars extending into the surrounding blocks and embedded therein, a rack structure adapted to support said power lines secured to each of said frames, said rack structure comprising a pair of arms dependingly carried by the upper horizontally-disposed bar of said frame and a horizontally-disposed bar member spaced below said upper horizontally-disposed bar and having an end secured to each of said arms, and longitudinally-disposed members secured to each of said frames for supporting the latter.

THOMAS J. HINCHON.

REFERENCES CITED

The following references are of record in the file of this patent:

UNITED STATES PATENTS

| Number | Name | Date |
|---|---|---|
| 384,948 | Young | June 19, 1888 |
| 441,043 | Berstaete | Nov. 18, 1890 |
| 917,521 | Baker | Apr. 6, 1909 |
| 2,046,410 | Porter et al. | July 7, 1936 |
| 2,050,968 | Gottwald et al. | Aug. 11, 1936 |

FOREIGN PATENTS

| Number | Country | Date |
|---|---|---|
| 178,250 | Canada | May 14, 1917 |